United States Patent [19]

Hagedorn-Olsen

[11] Patent Number: 4,523,840

[45] Date of Patent: Jun. 18, 1985

[54] DEVICE FOR BRINGING SHEETS INTO FLAT POSITION

[75] Inventor: Jens Hagedorn-Olsen, Hornbaek, Denmark

[73] Assignee: Océ-Helioprint AS, Kvistgard, Denmark

[21] Appl. No.: 459,751

[22] Filed: Jan. 21, 1983

[30] Foreign Application Priority Data

Feb. 1, 1982 [NL] Netherlands ........................ 8200356

[51] Int. Cl.³ ............................................ G03B 27/20

[52] U.S. Cl. ................................................... 355/91

[58] Field of Search ..................... 355/91, 92, 117, 73, 355/76; 354/203, 275, 276; 352/221, 227, 228

[56] References Cited

U.S. PATENT DOCUMENTS

| | | | |
|---|---|---|---|
| 895,577 | 8/1808 | McIntire | 355/92 |
| 2,929,309 | 3/1960 | Young | 355/91 |
| 3,311,037 | 3/1967 | Winkler et al. | 352/221 |
| 3,995,955 | 12/1976 | Töpfer | 355/91 |
| 4,080,068 | 3/1978 | Madigan | 355/73 |

*Primary Examiner*—L. T. Hix
*Assistant Examiner*—Della J. Rutledge
*Attorney, Agent, or Firm*—Albert C. Johnston

[57] ABSTRACT

An original holder or like device for bringing a sheet into a flat exposure plane in a reprographic apparatus comprises a transparent resilient support plate which normally is resiliently held slightly bowed and a rigid flat pressure plate such as a glass plate which can be pressed onto the convex side of the support plate to bring the support plate and a sheet resting on it into a flat position for exposure of the sheet.

8 Claims, 3 Drawing Figures

DEVICE FOR BRINGING SHEETS INTO FLAT POSITION

The invention relates to a device for bringing sheet-like materials into flat position in an exposure plane of a reprographic apparatus.

Devices for this purpose are known from German Pat. No. 226,575 and German Gebrauchsmuster No. 1,905,348.

German Pat. No. 226,575 discloses a contact copying apparatus comprising a first glass plate to support the sheets to be copied, which plate is secured in the apparatus frame by means of springs for movement in a direction perpendicular to the plane of the plate. A second glass plate is pivotally connected to the apparatus frame and can be brought into integral contact with either the first glass plate or sheets resting thereon, and the first glass plate is moved against the spring action to provide a contact pressure.

A disadvantage of such apparatus is that it may not bring the sheets to a flat position, because when the plates are closed they practically instantaneously come completely into contact with one another so that air bubbles can be included which will not be removed by increased contact pressure.

German Gebrauchsmuster No. 1,905,348 describes a contact copying apparatus comprising a fixed glass plate to support the sheets to be copied and a pressure plate made of a transparent plastic foil provided with a sealing edge. After the plates are closed air then included between the plates is removed by suction.

With that apparatus flat positioning can be obtained only by suction-extraction of the included air. A disadvantage of this is that unsightly Newton rings can readily be formed, particularly when glossy originals are being processed under damp conditions.

The principal object of the present invention is to provide a device by means of which sheets can be brought into a flat position in a simple manner, and which obviates the above-mentioned disadvantages.

The device of the invention is similar to known devices in that it comprises a support plate for the sheet-like material and a pressure plate, at least one of these plates being transparent, at least one of them being rigid and having a flat surface facing toward the other plate, and at least one of them being displaceable to dispose the plates in open and closed positions in which, respectively, the pressure plate is out of contact with and is in integral contact with the support plate or a sheetlike material resting thereon.

In a device according to the invention, however, unlike the known devices, one only of the plates is rigid and the other is a resilient plate which is formed substantially flat but is elastically deformed to and held in a resiliently bowed posture with its convex side facing toward the rigid plate when the plates are in open position, and which is elastically restored to a flat posture by pressure of the rigid plate when the plates are disposed in the closed position.

Consequently, when the plates are brought from open to closed position, as by movement of the rigid plate onto the bowed resilient plate, a linear contact will first be formed between the two plates and the area of contact then will progressively become wider through a convergent rolling action between the confronting surfaces of the plates. By virtue of this progressive engagement obtained with a rolling action, a sheet can be brought into a flat exposure position between the two plates with minimal risk of air bubbles being included between the plates, and the formation of Newton rings is inhibited.

In an advantageous way of practicing the invention, a sealing edge is provided about the periphery of the resilient plate and an air extraction system communicates with the space between the two plates. In that way any air still present between the plates in their closed position can be suction-extracted, so that even curled and pasted-up originals can be pressed sufficiently flat.

Other objects, features and advantages of the invention will be apparent from the following description of an illustrative embodiment, in which reference is made to the accompanying drawings. In the drawings.

Figure 1:
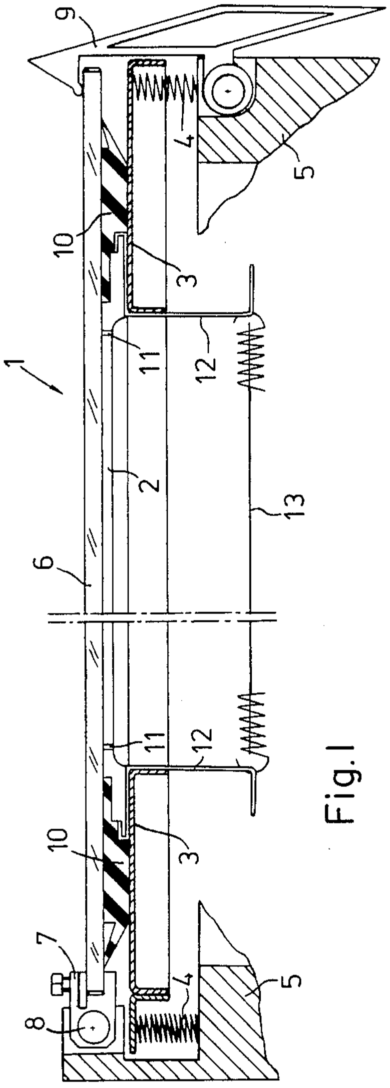
FIG. 1 is a cross-sectional view of an original holder embodying the invention, as provided for use in a reprographic camera.

The original holder shown in the drawings can be used to advantage, for example, in reprographic cameras of the kind disclosed in U.S. Pat. No. 4,021,115 and No. 4,361,398.

Referring to FIG. 1, an original holder 1 is shown which comprises a support plate 2 for originals, made of a resiliently flexible material, such e.g. as a transparent acrylic polymer. The support plate 2 has reinforced edges which seat on a framework 3 that is supported via compression springs 4 on the frame 5 of the reprographic camera.

The original holder also comprises a rigid pressure plate 6 which is made preferably of a transparent material such as glass and has a flat surface facing toward the support plate 2. The pressure plate 6 is mounted along one of its edges in a clamping bar 7 for pivotal movement relative to frame 5 about the axis of shaft 8, and it can be retained in the closed position as shown in FIG. 1 by a latch 9 pivotally connected to the frame 5.

A sealing edge strip 10 of rubber or like material is also connected to the framework 3 and surrounds the support plate 2. When the original holder is in the closed position the pressure plate 6 bears against the edge strip 10 so that strip 10 then provides a hermetic seal for the space contained between the support plate 2 and the pressure plate. Any air then present in that space can be extracted by connecting the space with an air extraction system (not shown) via openings 11 located in the support plate 2 outside its original or picture holding area.

Figure 2:
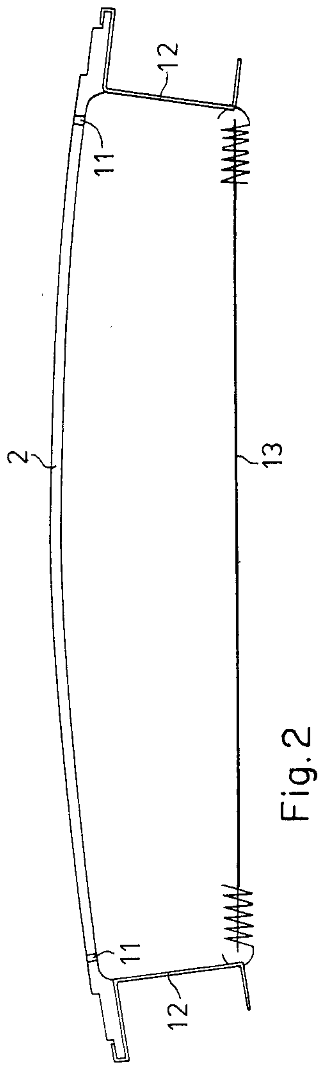
FIG. 2 is a cross-sectional view of a support plate of the apparatus of FIG. 1, showing that plate in a resiliently bowed posture.
Figure 3:
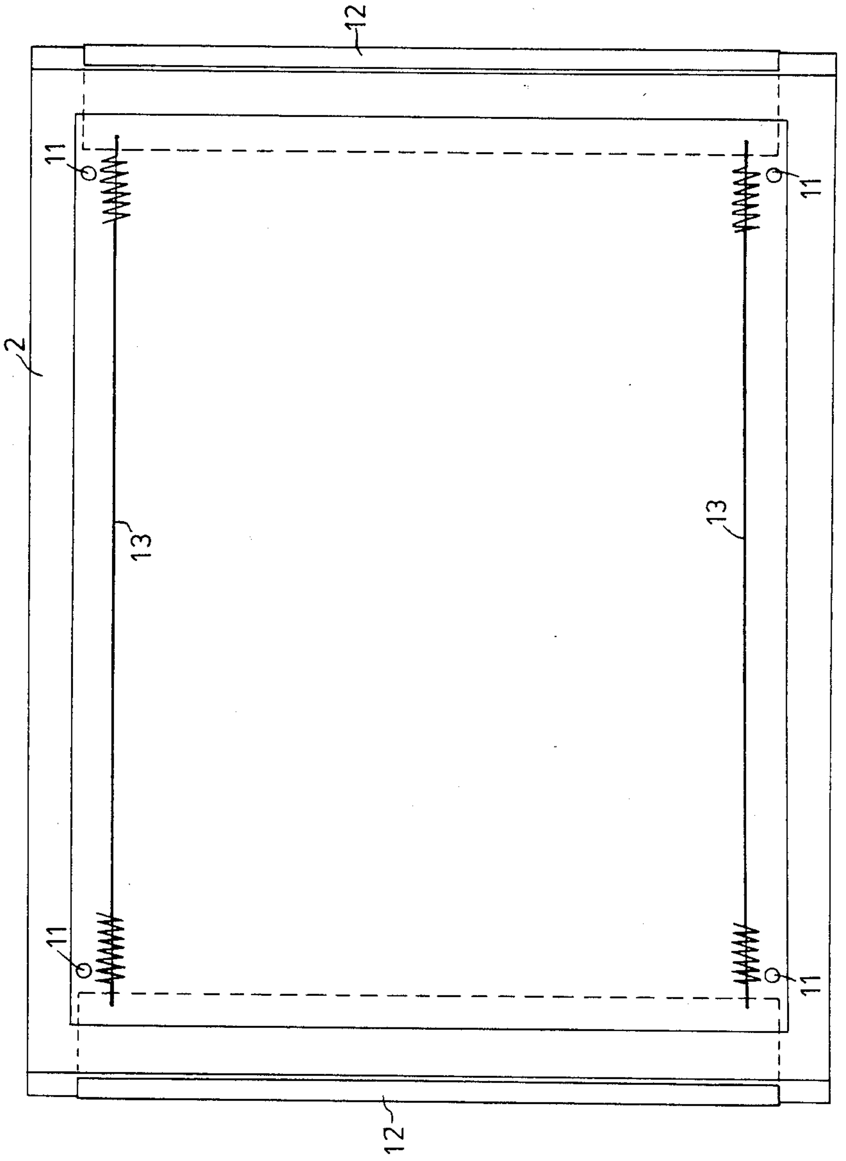
FIG. 3 is a plan view of the support plate.

The support plate 2 a formed substantially flat but is resilient so that it can be elastically deformed to and normally held in a resiliently bowed posture as shown in FIG. 2. In its bowed posture as shown of the plate 2 is elastically deformed evenly to a slight curvature. For this purpose, for instance, two opposite edges of the support plate 2 are provided with rigid strips 12 each of which comprises a clamp portion engaged with an edge of the support plate and an arm portion projecting substantially at right angles from the support plate; and the ends of the projecting arm portions of the strips 12 are interconnected by tension springs 13 so that in the absence of a counteracting pressure on the support plate 2 the springs 13 hold the support plate 2 resiliently in its bowed posture.

The original holder 1 functions as follows:

To place the original holder in open position, the pressure plate 6 is swung up about the axis of shaft 8 to a position out of contact with the support plate 2, thus enabling an original to be placed on the support plate. When the pressure plate is in this open position the support plate 2, under the force of the springs 13 acting through the strips 12, is bent resiliently to and held in a bowed posture with its convex side facing toward the pressure plate.

When the original holder is to be closed, the pressure plate 6 is swung down, coming first into substantially linear and then into converging rolling contact with the convex surface of the bowed support plate 2 or of a sheet placed on it. The pressure of plate 6 thus forces the support plate 2 to progressively decreasing curvatures until plate 2 or a sheet present on it reaches a flat posture in integral surface engagement with the pressure plate. When in closed position the pressure plate 6 is locked by latch 9 and sealed against the edge strip 10, so that any air still included in the space between plates 2 and 6 can be extracted by suction applied via the openings 11. When the pressure plate 6 is unlocked by releasing latch 9, the springs 4 and 13 act to force the pressure plate up again. Due to the bending moments of force constantly excited oppositely on opposite edge portions of plate 2 by the springs 13, the support plate 2 automatically rebounds to the resiliently bowed posture.

I claim:

1. A device for bring sheetlike material into flat position in an exposure plane of a reprographic apparatus, comprising a support plate having a transparent resilient body portion presenting an even support surface to receive the sheetlike material, a pressure plate for pressing said material flat against said support surface, said pressure plate being substantially flat and rigid and transparent and being pivoted along an edge thereof for swinging movement between open and closed positions in which, respectively, said pressure plate is out of contact with and in integral contact with said support surface or a sheetlike material resting thereon, said support plate being formed of a transparent resilient resin and said body portion being formed substantially flat but being elastically deformable to a resiliently bowed posture, and yieldable force applying means acting on opposite edge portions of said support plate for normally holding said body portion in a resiliently slightly bowed posture with said support surface slightly convex, said body portion being displaced progressively to a flat posture against the force of said yieldable means by progressive engagement of said pressure plate against said support surface upon movement of the pressure plate from open to closed position.

2. A device according to claim 1, said support plate formed of an acrylic resin and said pressure plate being a rigid transparent glass plate.

3. A device according to claim 1 and further comprising a sealing strip disposed about the peripheral edge of said support plate for hermetic sealing engagement with the rigid plate in said closed position and passage means communicating with and through which air may be extracted from the space between said plates in closed position.

4. A device for holding sheetlike material for exposure in a reprographic apparatus, comprising a support member framing an exposure opening, a support plate having reinforced opposite edge portions seated on said support member and having a transparent body portion of substantially uniform thickness that spans said exposure opening and presents an even, upwardly facing support surface to receive said material; a substantially flat, rigid transparent pressure plate hinged on an axis along an edge thereof for swinging movement between an open position away from said support plate and a closed position in integral contact with said support surface or sheetlike material resting thereon, said support plate being composed of resilient transparent resin and its said body portion being formed substantially flat but being elastically deformable to a slightly upwardly bowed posture; and means applying to said opposite edge portions oppositely directed moments of force that elastically deform said body portion to and hold it elastically bent in a slightly upwardly bowed posture when said pressure plate is away from closed position, said body portion being displaced progressively to a flat posture against the force of said force applying means by progressive engagement of said pressure plate against said support surface upon movement of the pressure plate from open to closed position.

5. A device according to claim 4, said force applying means comprising arms respectively engaged with said opposite edge portions and projecting downwardly from them inside said support member and yieldable tension means including tension springs interconnecting respective end portions of said arms and constantly applying oppositely to them tension sufficient to deform said body portion elastically to said upwardly bowed posture.

6. A device according to claim 4, further comprising a sealing strip disposed about the periphery edge of said support plate for hermetic sealing engagement with said pressure plate in said closed position and passage means communicating with and through which air may be extracted from the space between said plates in closed position.

7. A device according to claim 4, further comprising a frame having said pressure plate pivoted to a backward part thereof, latch means on a forward part of said frame for engaging and holding said pressure plate in closed position, and compression spring means disposed between said support member and underlying parts of said frame and yieldably positioning said support member and said support plate thereon so that said support plate and said compression spring means are pressed downward by and exert upward force on said pressure plate in closed position.

8. A device according to claim 4, 5, 6, or 7, said support plate being formed of an acrylic resin and said pressure plate being a glass plate.

* * * * *